United States Patent
Sudou et al.

(10) Patent No.: US 8,125,730 B2
(45) Date of Patent: Feb. 28, 2012

(54) MAGNETIC TAPE LIBRARY DEVICE

(75) Inventors: Shinichi Sudou, Tokyo (JP); Hiroaki Ishii, Tokyo (JP); Satoshi Wada, Tokyo (JP)

(73) Assignee: NEC Corporation, Tokyo (JP)

( * ) Notice: Subject to any disclaimer, the term of this patent is extended or adjusted under 35 U.S.C. 154(b) by 310 days.

(21) Appl. No.: 12/588,644

(22) Filed: Oct. 22, 2009

(65) Prior Publication Data

US 2010/0103558 A1    Apr. 29, 2010

(30) Foreign Application Priority Data

Oct. 27, 2008   (JP) ................................ 2008-275704

(51) Int. Cl.
*G11B 15/68* (2006.01)
(52) U.S. Cl. ...................................................... 360/92.1
(58) Field of Classification Search ................ 360/92.1, 360/98.06; 720/630, 645, 623; 369/30, 48, 369/36.01, 30.42
See application file for complete search history.

(56) References Cited

U.S. PATENT DOCUMENTS

| | | | |
|---|---|---|---|
| 6,707,636 B2 * | 3/2004 | Coffin et al. | ................. 360/92.1 |
| 6,813,113 B1 | 11/2004 | Mueller et al. | |
| 7,130,148 B2 | 10/2006 | Tanaka | |
| 2003/0117744 A1 | 6/2003 | Tanaka | |
| 2004/0103292 A1 * | 5/2004 | Shirouzu | ........................ 713/193 |
| 2005/0062794 A1 * | 3/2005 | Kanamitsu et al. | ............. 347/31 |
| 2005/0152061 A1 | 7/2005 | Hoelsaeter | |
| 2007/0127323 A1 | 6/2007 | Owens | |

FOREIGN PATENT DOCUMENTS

| | | |
|---|---|---|
| EP | 1 528 564 A2 | 5/2005 |
| JP | 2000-251356 A | 9/2000 |
| JP | 2003-196901 | 7/2003 |

OTHER PUBLICATIONS

U.K. Combined Search and Examination Report dated Dec. 23, 2009.
Japanese Office Action dated Nov. 24, 2010, with partial English translation.

* cited by examiner

*Primary Examiner* — Allen Cao
(74) *Attorney, Agent, or Firm* — McGinn IP Law Group, PLLC (57) ABSTRACT

The magnetic tape library device is configured, including: a front magazine and a rear magazine for housing a large number of magnetic tape cartridges; a device main body in which the both magazines are housed in a parallel state in a freely slidable manner; an accessor mechanism for transporting the cartridge taken out from the magazines; and a magnetic tape drive which loads the magnetic tape cartridge and reads/writes data. A magazine pullout mechanism for pulling out the rear magazine and a magazine extracting mechanism for extracting the rear magazine from the device main body are provided.

11 Claims, 9 Drawing Sheets

MAGNETIC TAPE LIBRARY DEVICE

CROSS-REFERENCE TO RELATED APPLICATION

This application is based upon and claims the benefit of priority from Japanese patent application No. 2008-275704, filed on Oct. 27, 2008, the disclosure of which is incorporated herein in its entirety by reference.

BACKGROUND OF THE INVENTION

1. Field of the Invention

The present invention relates to a magnetic tape library device. More specifically, the present invention relates to a magnetic tape library device which, among a plurality of cartridge housing bodies having a large number of magnetic tape cartridges housed therein and are placed in parallel within a horizontal plane, can easily pull out a cartridge housing body that is on a back side of the inserting/extracting direction to a prescribed position, and then pull it out to the outside the device.

2. Description of the Related Art

There has been known a magnetic tape library device which includes: a cartridge housing body for housing a plurality of magnetic tape cartridges; a magnetic tape drive which loads one of the magnetic tape cartridges taken out from the cartridge housing body to read/write data; and an accessor mechanism which mutually moves the magnetic tape cartridge between the cartridge housing body and the magnetic tape drive (see Japanese Unexamined Patent Publication 2003-196901 (Patent Document 1), for example).

However, with the magnetic tape library device disclosed in this Patent Publication, the packaging density of the magnetic tape cartridges cannot be increased sufficiently considering the fact that the device becomes large-scaled.

In the meantime, there has been known a magnetic tape library device in which a cartridge housing body is placed slidably within a horizontal plane along the inserting/extracting direction. For such device, there are a type in which the cartridge housing body in a single piece is placed slidably along the inserting/extracting direction, and a type in which the cartridge housing body is divided in two pieces in the back and the front (longitudinally).

However, there are following issues pointed out with the magnetic tape library device in which the cartridge housing body is slidably placed within the horizontal plane.

That is, for increasing the packaging density of the magnetic tape cartridges with the type having the single-piece cartridge housing body, the weight as a whole becomes increased. This makes it difficult to pull out and extract the cartridge housing body from the device or to mount it again. Further, since the cartridge housing body becomes heavy, it is necessary to increase the strength of a support member for supporting the cartridge housing body. Therefore, the device as a whole becomes large-scaled, and the weight becomes heavier.

With the type in which the cartridge housing body is divided into two pieces in the back and front, the cartridge housing body on the front side is slidable while the cartridge housing body on the back side is fixed. Thus, a robot or the like is used for exchanging the magnetic tape cartridges placed inside the cartridge housing body on the back side. However, before reaching the back-side cartridge housing body, there is a space where the front-side cartridge housing body is placed. Therefore, it is necessary to operate the robot or the like within that space for exchanging the magnetic tape cartridges. As a result, the structure of the robot or the like becomes complicated, and the cost therefore is increased.

SUMMARY OF THE INVENTION

The present invention has been designed to overcome the foregoing issues. It is therefore an exemplary object of the invention to provide a magnetic tape library device with which: among cartridge housing bodies placed in parallel within a same plane, a cartridge housing body on the back side of the inserting/extracting direction can be easily pulled and extracted towards the front side; magnetic tape cartridges within a plurality of cartridge housing bodies can be exchanged easily; and the packaging density of the magnetic tape cartridges can be increased.

In order to achieve the foregoing object, the magnetic tape library device according to an exemplary aspect of the invention is a magnetic tape library device which includes: a plurality of cartridge housing bodies for housing a large number of magnetic tape cartridges inside thereof; a device main body for housing the cartridge housing bodies within a same plane in a freely slidable manner and in parallel to an inserting/extracting direction; an accessor mechanism provided to one of side faces of the device main body along the inserting/extracting direction for transporting the magnetic tape cartridge that is extracted from one of the plurality of cartridge housing bodies; and a magnetic tape drive provided to the device main body for loading the magnetic tape cartridge transported by the accessor mechanism to read and write data, wherein the device main body includes: a housing body pullout mechanism for pulling out the cartridge housing body on a back side of the inserting/extracting direction among the plurality of the cartridge housing bodies towards a front side of the inserting/extracting direction; and a housing body extracting device for extracting, from the device main body, the cartridge housing body pulled out by the housing body pullout mechanism.

DETAILED DESCRIPTION OF THE EXEMPLARY EMBODIMENTS

Hereinafter, an exemplary embodiment of a magnetic tape library device (simply referred to as a device hereinafter) of the present invention will be described in detail by referring to the accompanying drawings.

Figure 1:
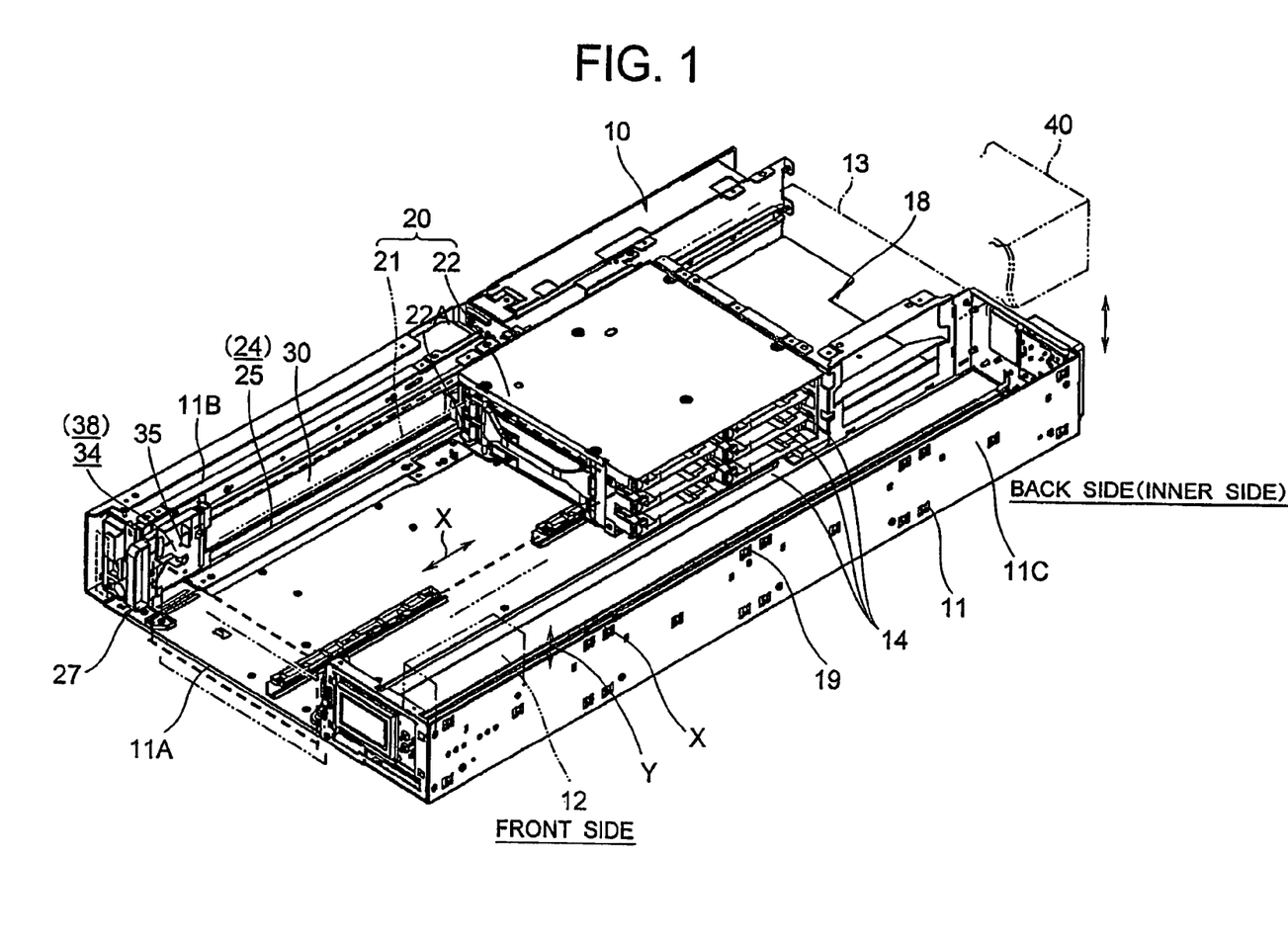
FIG. 1 is an overall perspective view showing an exemplary embodiment of a magnetic tape library device according to the invention.
Figure 2:
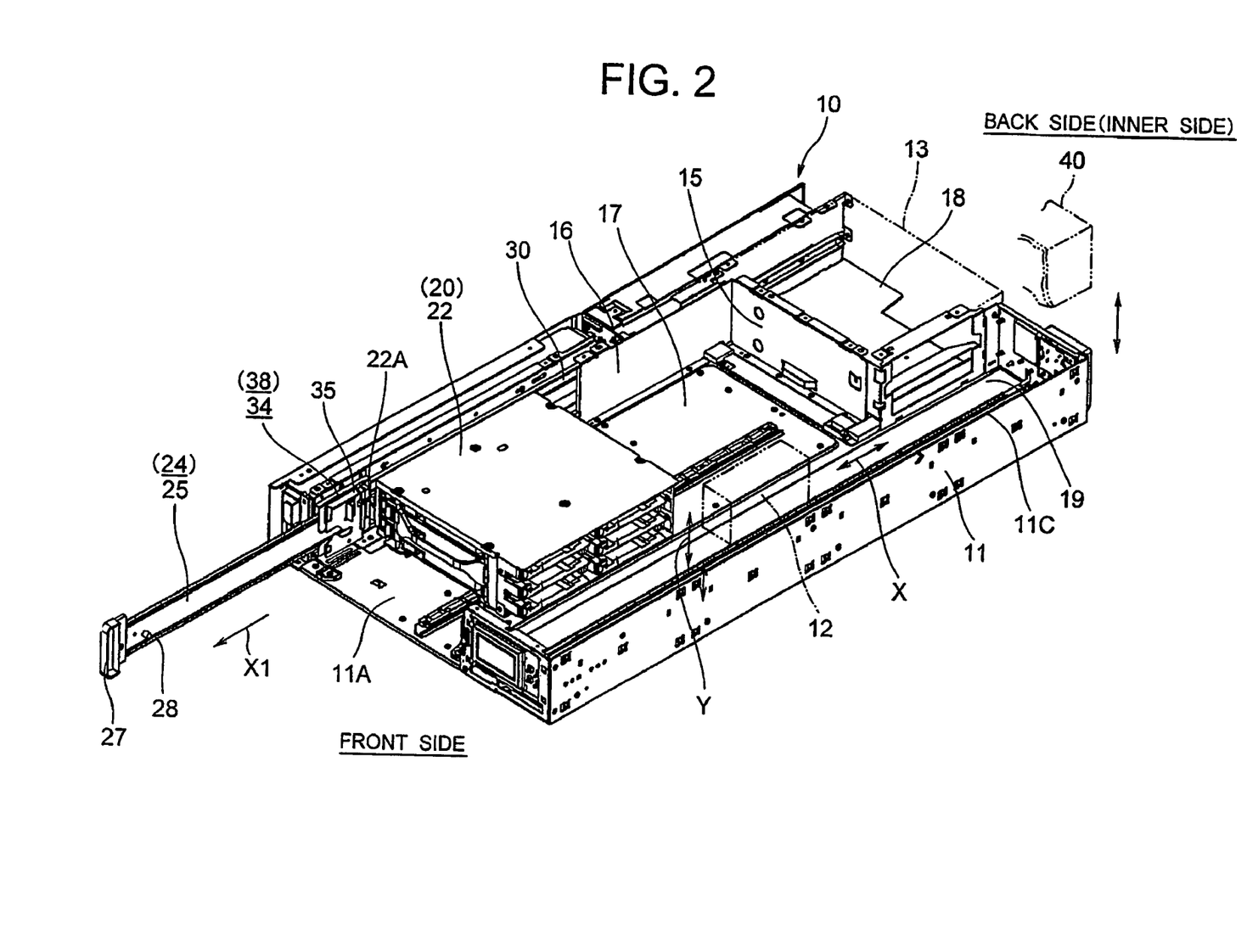
FIG. 2 is an overall perspective view showing a state of the device according to the exemplary embodiment, in which a rear magazine is being pulled out.

FIG. 1 and FIG. 2 show a device 10 of the exemplary embodiment. FIG. 1 is an overall perspective view of the device 10, and FIG. 2 is an overall perspective view of a state in which a rear magazine 22 is pulled out from the device 10.

As shown in FIG. 1 and FIG. 2, the device 10 is configured with: a magazine 20 as a plurality of cartridge housing bodies for respectively housing a large number of magnetic tape cartridges 14 inside thereof; and a device main body 11 to which the magazine 20 is slidably loaded within a horizontal plane in a parallel state along an inserting/extracting direction X.

An accessor mechanism 12 for transporting the magnetic tape cartridge 14 taken out from the magazine 20 is movably provided to the one of the side faces along the inserting/extracting direction X, i.e., along the moving direction X, of the device main body 11.

Further, on the inner-side position of the magazine 20 of the device main body 11, disposed is a magnetic tape drive 13 for reading/writing data by loading the magnetic tape cartridge 14 that is transported by the accessor mechanism 12.

Furthermore, the device main body 11 and the accessor mechanism 12, the magnetic tape drive 13, the magazine 20, and the like mounted to the device main body 11 are covered by a detachable cover 40.

The device main body 11 is formed with a thin steel plate or the like, and the overall plan shape thereof is formed in a rectangular shape.

Further, in the device main body 11, a first chassis part 11B is formed by being raised up from a bottom face part 11A of the device main body 11 on one of its side faces along the longitudinal direction (inserting/extracting direction X). On the other side face, a second chassis part 11C is formed by being raised up from the bottom face part 11A of the device main body 11 and by being opposed to the first chassis part 11B.

The first chassis part 11B is formed to have substantially a prism sectional shape, although not shown in detail. A power source, a cooling device, and the like are housed inside thereof. Meanwhile, the second chassis part 11C is disposed by being opposed to the first chassis part 11B, and it is provided at a position with a prescribed space in a direction that goes away towards the outer side from the magazine 20.

Further, the side face of a front magazine 21 and a rear magazine 22 configuring the magazine 20 on the magnetic tape cartridge 14 extracting side is opposed to the second chassis part 11C. The space between the extracting side of the both magazines 21, 22 and the second chassis part 11C serves as an accessor moving space 19 for the accessor mechanism 12 to transport the magnetic tape cartridge 14.

In the device main body 11, the space sandwiched by the bottom face part 11A, the first chassis part 11B, and the second chassis part 11C forms something like a U-shaped pathway. On relatively the back side of such space in the inserting/extracting direction X, a first partition member 15 is provided to be in orthogonal to the inserting/extracting direction X.

This first partition member 15 is formed to have substantially a same top-face height as those of the both chassis parts 11B and 11C.

Furthermore, on one end part of the first partition part 15 on the first chassis part 11B side, a second partition member 16 is provided continuously from the one end of the first partition member 15 to form an L-letter shape by the both members.

The length of the second partition member 16 is almost equal to the length of the rear magazine 22 in the inserting/extracting direction X. With this, when the rear magazine 22 is at a position on the back side of the inserting/extracting direction X, the back side face and one face orthogonal to that face are respectively surrounded by the first partition member 15 and the second partition member 16.

The front side of the inserting/extracting direction X sectioned by the partition member 15 is a magazine housing space 17 for housing the magazine 20, and the back side of the inserting/extracting direction X sectioned by the first partition member 15 is a drive set space 18 for setting the magnetic tape drive 13.

The magazine 20 is provided to the device main body 11 within a horizontal plane in a freely movable manner along the inserting/extracting direction X.

That is, the magazine 20 is divided in the direction that is orthogonal to the inserting/extracting direction X, and it is configured with the front magazine 21 disposed on the front side (obliquely to the left side in FIG. 1 and FIG. 2) of the inserting/extracting direction X and the rear magazine 22 disposed on the back side (obliquely to the right side in FIG. 1 and FIG. 2) of the inserting/extracting direction X while being placed adjacent to the front magazine 21. Those front magazine 21 and the rear magazine 22 are placed within the magazine housing space 17 in a parallel state along the inserting/extracting direction X.

In FIG. 1, only the rear magazine 22 is illustrated in detail (with a solid line) while the front magazine 21 is illustrated with a virtual line. However, the structures of both magazines 22 and 21 are substantially the same. Therefore, detailed explanations thereof are provided by referring to the rear magazine 22.

Figure 3:
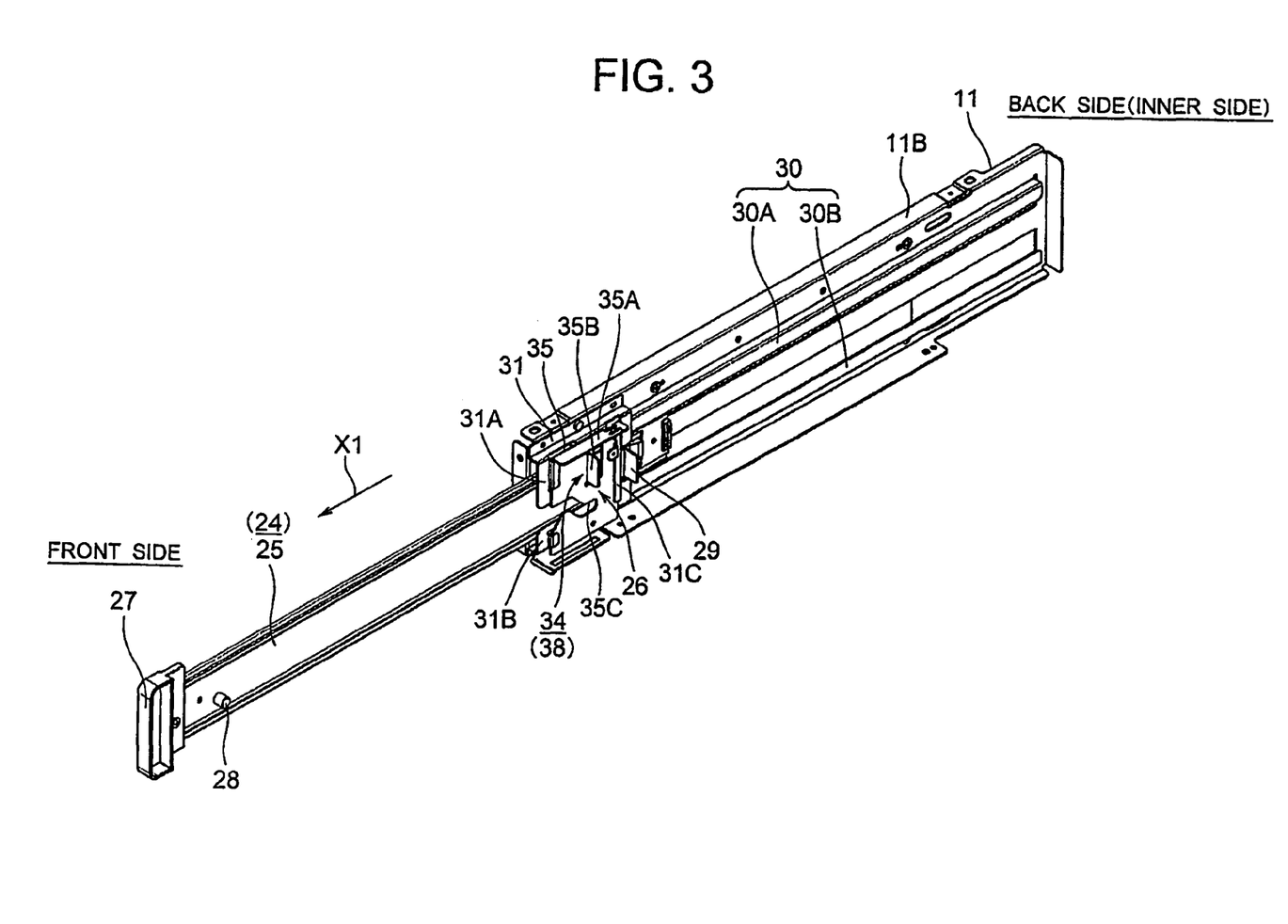
FIG. 3 is a perspective view showing a state in which a magazine slider is being pulled out from a first chassis part.
Figure 4:
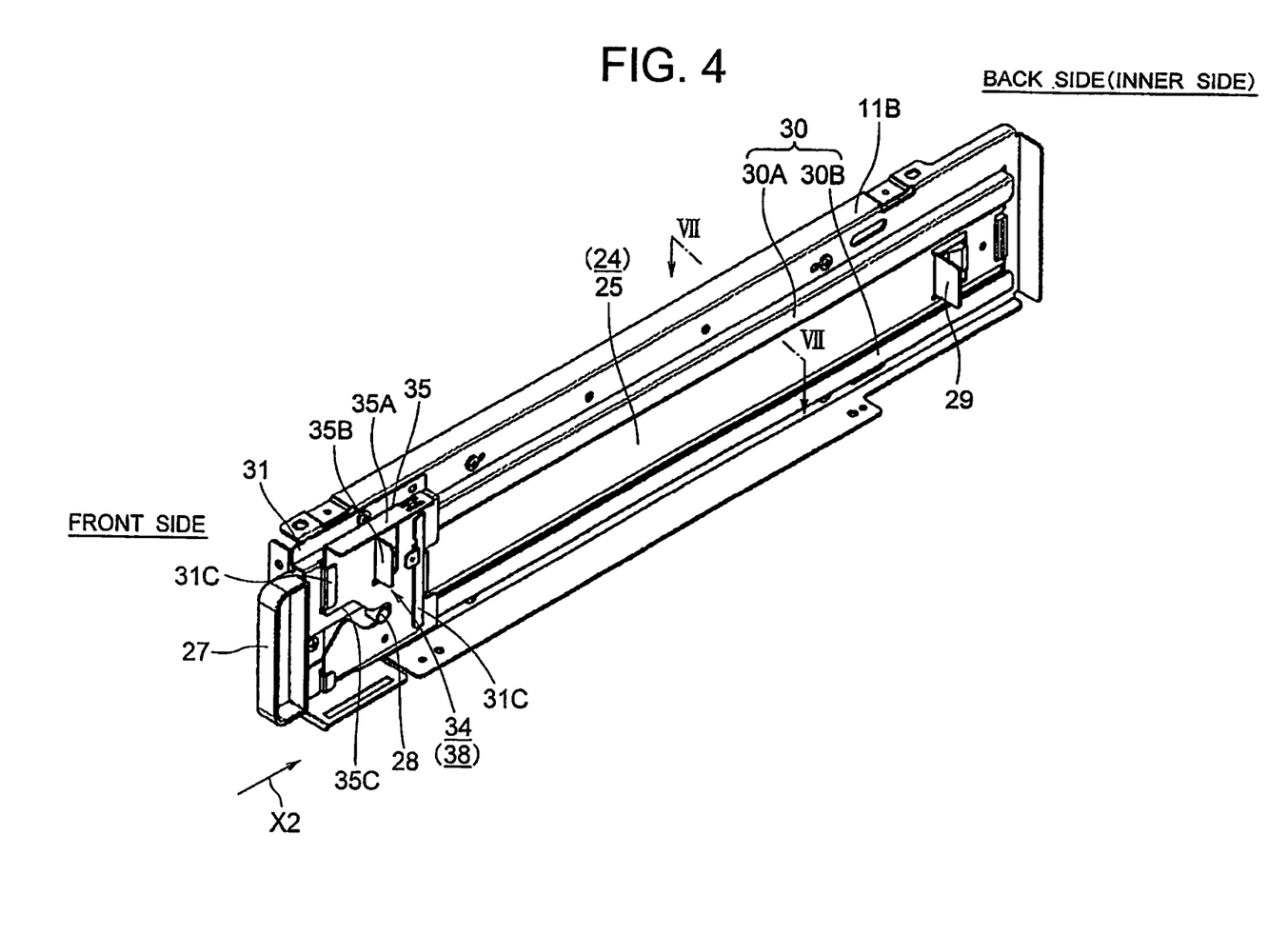
FIG. 4 is a perspective view showing a state in which the magazine slider is being pushed into the back side (inner side) from the state of FIG. 3.

As shown in detail in FIG. 3 and FIG. 4, the rear magazine 22 is formed in a frame shape having a top face part and a bottom face part, and the inside thereof is sectioned appropriately for being able to house a large number of magnetic tape cartridges 14. The rear end part in the inserting/extracting direction X of such rear magazine 22 is to abut against the surface of the first partition member 15. Further, the front end in the inserting/extracting direction X of the rear magazine 22 is to abut against the rear end of the front magazine 21.

As described above, the rear magazine 22 is formed to be freely slidable within the magazine housing space 17 by being guided by a guide rail along the inserting/extracting direction X.

Although not shown in detail, twelve magnetic tape cartridges 14 in total, i.e., three stacked cartridges in two rows in the inserting/extracting direction and in two rows in the direction orthogonal to the inserting/extracting direction, are housed inside the rear magazine 22.

In the meantime, eighteen magnetic tape cartridges 14 in total, i.e., three stacked cartridges in three rows in the inserting/extracting direction and in two rows in the direction orthogonal to the inserting/extracting direction, can be housed inside the front magazine 21, so that the numbers of the magnetic tape cartridges 14 that can be housed inside both magazines 21 and 22 are different. That is, the sizes of both magazines 21 and 22 are different.

Transfer of the magnetic tape cartridges 14 inside the both magazines 21, 22 to the accessor mechanism 12 is done by a known transfer mechanism mounted into the rear magazine 22 and a receiving mechanism of the accessor mechanism 12.

After receiving a prescribed magnetic tape cartridge 14, the accessor mechanism 12 moves in the accessor transfer space 19, and gives the magnetic tape cartridge 14 to the magnetic tape drive 13.

The rear magazine 22 is pulled out towards the front side of the inserting/extracting direction X by a magazine pullout mechanism 24 as a housing body pullout mechanism, and it can also be extracted from the device main body 11 by a magazine extracting mechanism 38 as a housing body extracting mechanism.

That is, the magazine pullout mechanism 24 is configured, including: a magazine slider 25 as a slide member that is slidable along the inserting/extracting direction X; a guide rail 30 as a slide guide member for guiding the magazine slider 25 in a slidable manner; and an engaging projection part 29 provided at the end part of the magazine slider 25 on the back side of the inserting/extracting direction X.

As shown in detail in FIG. 3 and FIG. 4, the magazine slider 25 is formed in a thin and long plate shape, and it is formed to slide by being guided by the guide rail 30 as described above.

Figure 7:
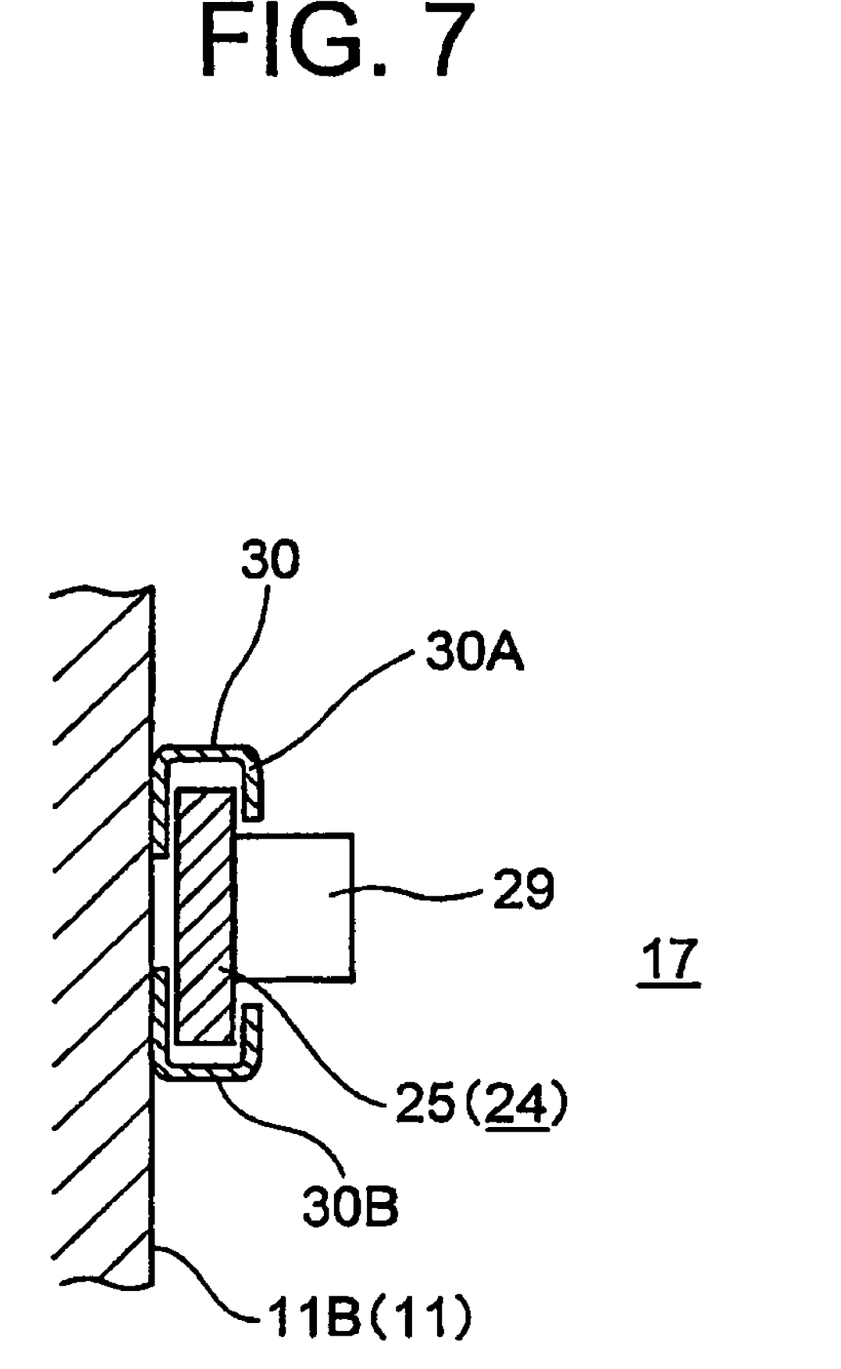
FIG. 7 is a sectional view taken along a line VII-VII of FIG. 4.

As shown in detail in FIG. 7, this guide rail 30 is configured with a top rail 30A formed to have substantially "7"-shaped section for guiding the top part of the magazine slider 25 and with a bottom rail 30B formed by attaching substantially a "7"-shaped section in an opposite manner for guiding the bottom part of the magazine slider 25.

Further, the top rail 30A and the bottom rail 30B are attached to the first chassis part 11B along the magazine housing space 17 of the device main body 11.

As shown in detail in FIG. 3, the top rail 30A and the bottom rail 30B configuring the guide rail 30 are formed by being extended from the back side end position of the first chassis part 11B to the vicinity of the front side of the inserting/extracting direction along the inserting/extracting direction X, i.e., extended to a position right before a magazine blocker 35 to be described later.

Further, at the front-side position of the inserting/extracting direction X, provided is a slider holding member 31 as an attachment member which covers the rear end part of the magazine slider 25 and holds the entire magazine slider 25 when the magazine slider 25 is pulled out.

Figure 5:
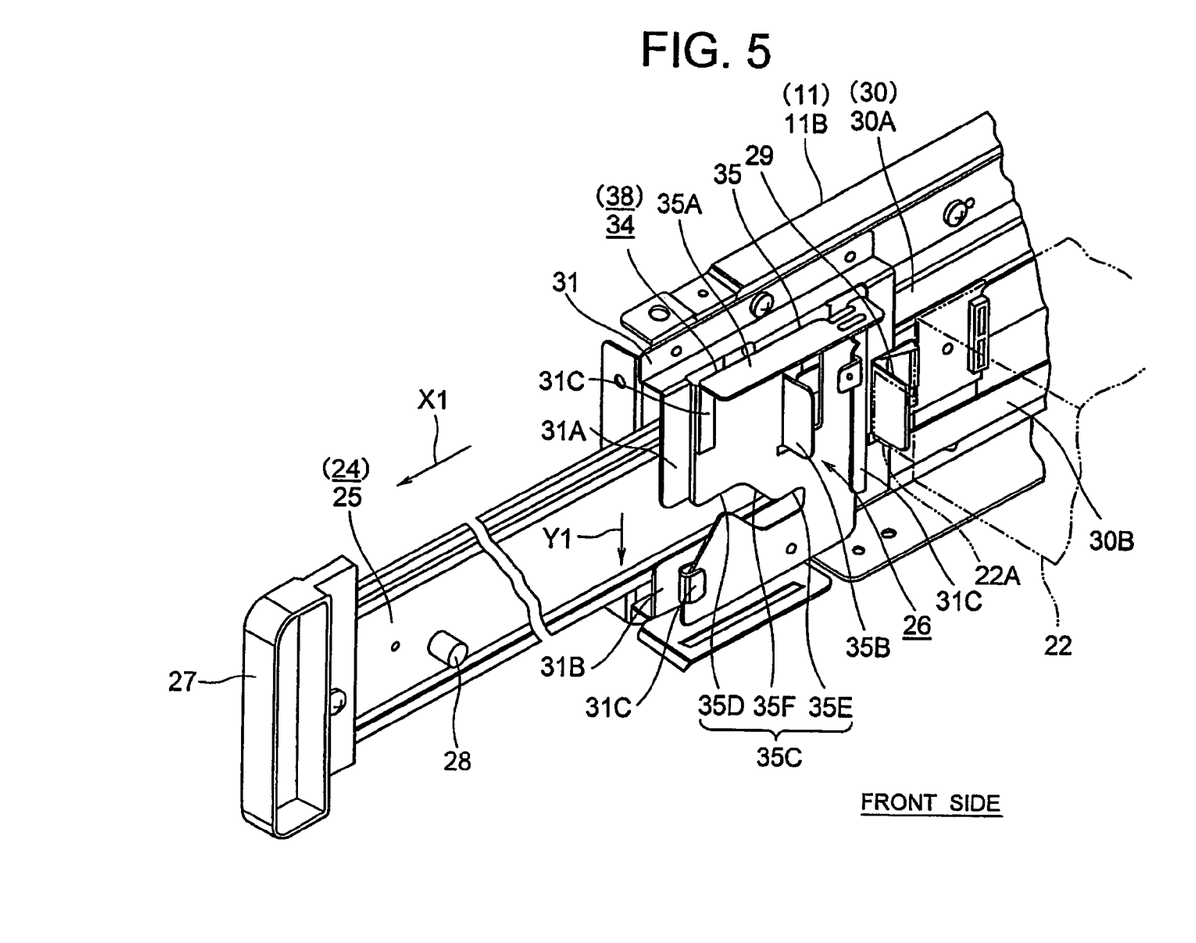
FIG. 5 is a detailed perspective view showing a front-side end part of the pulled-put magazine slider of the exemplary embodiment.

As shown in detail in FIG. 5, the slider holding member 31 has a prescribed width along the inserting/extracting direction X. At the same time, an upper-side rail 31A and a lower-side rail 31B are provided on the surface of the slider holding member 31 at positions extended from the top rail 30A and the bottom rail 30B of the guide rail 30.

The space size between the upper-side rail 31A and the lower-side rail 31B is formed to be larger than the space size between the top rail 30A and the bottom rail 30B of the guide rail 30. Thereby, the magazine slider 25 is movable in the vertical direction inside the slider holding member 31.

Further, on the surfaces of the upper-side rail 31A and the lower-side rail 31B, formed is a guide part 31C for guiding the vertical movements of the magazine blocker 35 on both sides of the width direction. Accordingly, the upper-side rail 31A, the lower-side rail 31B, and the guide part 31C can guide the respective partner members in the directions orthogonal to each other.

At the front-side tip of the magazine slider 25 in the inserting/extracting direction (slide direction) X, provided is a grip 27 which is a grasping member for grasping and pulling the magazine slider 25 to slide it. The grip 27 is formed in a shape that is easy to insert fingers. As shown in FIG. 5, by holding the grip 27 with a hand and pulling it towards the front side as shown with an arrow X1, the magazine slider 25 can be pulled out by being guided with the top rail 30A and the bottom rail 30B. Therefore, the magazine slider 25 can be pulled out easily.

Figure 6:
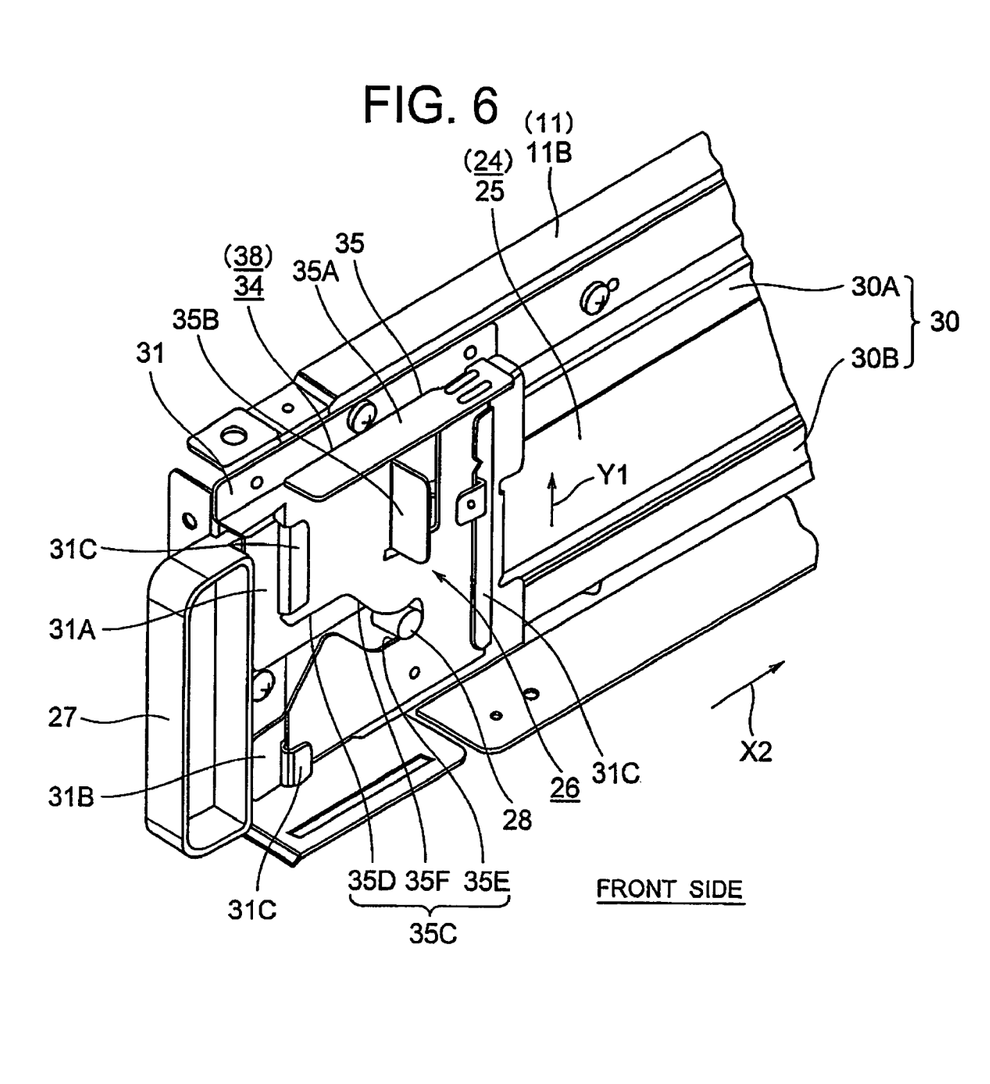
FIG. 6 is a detailed perspective view showing a state in which the magazine slider is being pushed into the back side (inner side) from the state of FIG. 5.

Further, as shown with an arrow X2 in FIG. 6, when the grip 27 is pushed into the inner side, most of the magazine slider 25 except the grip 27 is housed within the upper-side rail 31A and the lower-side rail 31B of the slider holding member 31 and the guide rail 30.

As shown in detail in FIG. 3, FIG. 5, and the like, a positioning pin 28 projected towards the rear magazine 22 side is provided at the end part of the magazine slider 25 on the grip 27 side. This positioning pin 28 can be engaged with a cam groove 35C that is formed in the magazine blocker 35 to be described later.

In the vicinity of the end part (inner-side end part) of the magazine slider 25 on the opposite side of the grip 27, provided is the engaging projection part 29 that is formed by cutting out a part of the magazine slider 25 and bending it towards the same direction as the projected direction of the positioning pin 28. This engaging projection part 29 is formed by being bent substantially at 90 degrees with respect to the surface of the magazine slider 25.

In the meantime, as shown in FIG. 1, FIG. 2, FIG. 5, and the like, an engaging part 22A projected towards the magazine slider 25 side is formed on the side face of the rear magazine 22 on the magazine slider 25 side on the front side of the inserting/extracting direction. This engaging part 22A is formed by cutting out a part of the side face and bending that part, and it can be engaged with the engaging projection part 29 of the magazine slider 25.

Figure 8:
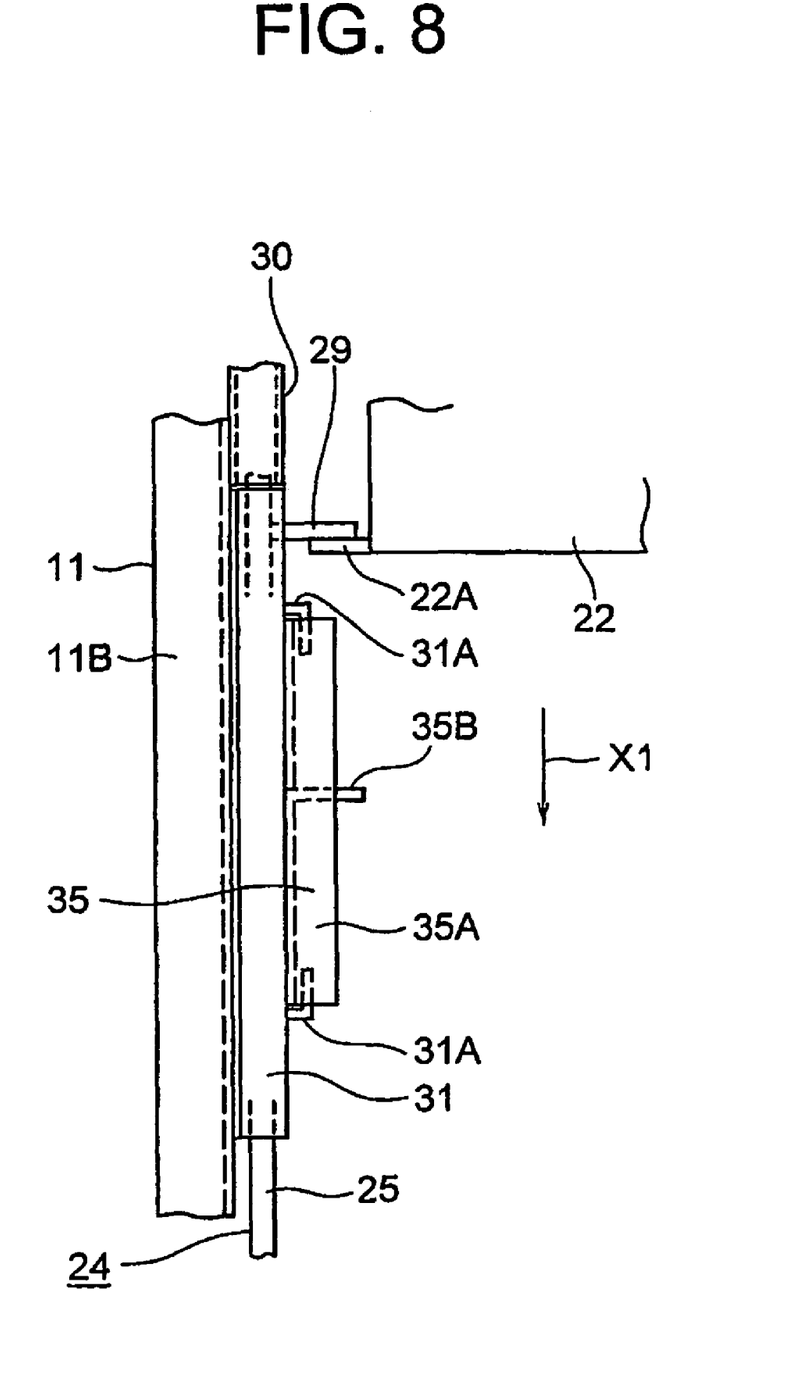
FIG. 8 is a plan schematic view showing an engaged state of the magazine pullout mechanism and the rear magazine.

As shown in FIG. 8, the engaging part 22A of the rear magazine 22 and the engaging projection part 29 of the magazine slider 25 are engaged in a state where the surface (the front side of the inserting/extracting direction X) of the engaging projection part 29 of the magazine slider 25 is abutted against the back face (back side of the inserting/extracting direction X) of the engaging part 22A of the rear magazine 22.

Therefore, when the magazine slider 25 housed inside the guide rail 30 of the attachment member 26 is moved along the pullout inserting/extracting direction X by grasping the grip 27 and pulling it out towards the front side with respect to the rear magazine 22 placed within the magazine housing space 17 on the back side of the inserting/extracting direction X, the rear magazine 22 is moved by being pulled by the magazine slider 25 since the engaging projection part 29 of the magazine slider 25 and the engaging part 22A of the rear magazine 22 are engaged.

After pulling out the rear magazine 22 and fixing it at a prescribed position, the magazine slider 25 is pushed in to be housed in an initial position, i.e., inside the slider holding member 31 and the guide rail 30.

In the slider holding member 31, the guide part 31C for guiding the vertical movements of the magazine blocker 35 is formed on both sides in the width direction of the member 31. Further, also provided is a jet-out preventing mechanism 34 for preventing the rear magazine 22 pulled out by the magazine slider 25 from being jetted out from the device main body 11 with the pulling out force.

That is, as shown in detail in FIG. 7 and FIG. 8, the jet-out preventing mechanism 34 is configured, including: the magazine blocker 35 that is provided to the first chassis part 11B of the device main body 11 via the slider holding member 31; and a locking member fixing mechanism 26 provided to the magazine blocker 35 and the magazine slider 25, which functions when the rear magazine 22 is pulled out towards the front side by the magazine slider 25 so as to fix the rear magazine 22 at a position to be engaged with the engaging part 22A.

The magazine blocker 35 is formed to have a slightly narrower flat-face part than the front-face part of the slider holding member 31, and it is attached to the front-face part of the slider holding member 31 to be freely movable with respect to the slider holding member 31 in the vertical direction that is orthogonal to the inserting/extracting direction X.

In substantially the center part on the top part of the magazine block 35 in the width direction thereof along the inserting/extracting direction, a stopper part 35B for being engaged with the engaging part 22A of the rear magazine 22 is provided.

The stopper part 35B is formed in a rectangular tongue-like shape, and the tongue-like shape is formed by cutting out a part of the surface of the magazine blocker 35 and bending that part at substantially 90 degrees towards the direction orthogonal to the inserting/extracting direction and towards the rear magazine 22 side.

Further, at the top end of the magazine blocker 35, a top-face bent part 35A bent substantially at 90 degrees towards the rear magazine 22 side is formed above the stopper part 35B. This top-face bent part 35A functions to stop the magazine blocker 35 at a prescribed position so that it does not go down excessively.

The locking member fixing mechanism 26 is configured with: the positioning pin 28 provided to the grip 27 side of the magazine slider 25 by being projected towards the rear magazine 22 side; and the cam groove 35C formed in the magazine blocker 35.

As shown in detail in FIG. 5 and FIG. 6, the shape of the cam groove 35C is formed with an upper groove 35D and a lower groove 35E formed along the inserting/extracting direction having a step in the vertical direction and with an oblique groove part 35F connecting between the upper groove 35D and the lower groove 35E.

Further, the space between the upper groove 35D and the lower groove 35E is the moving distance of the magazine blocker 35 in the vertical direction. When the magazine slider 25 is pulled out and the positioning pin 28 is moved from the position of the lower groove 35E via the upper groove 35D, the engagement between the positioning pin 28 and the cam groove 35C is released. Thereby, as shown with an arrow Y1 in FIG. 5 and also shown in FIG. 9, the magazine blocker 35 moves down to the position shown with a virtual line due to its own weight.

Figure 9:
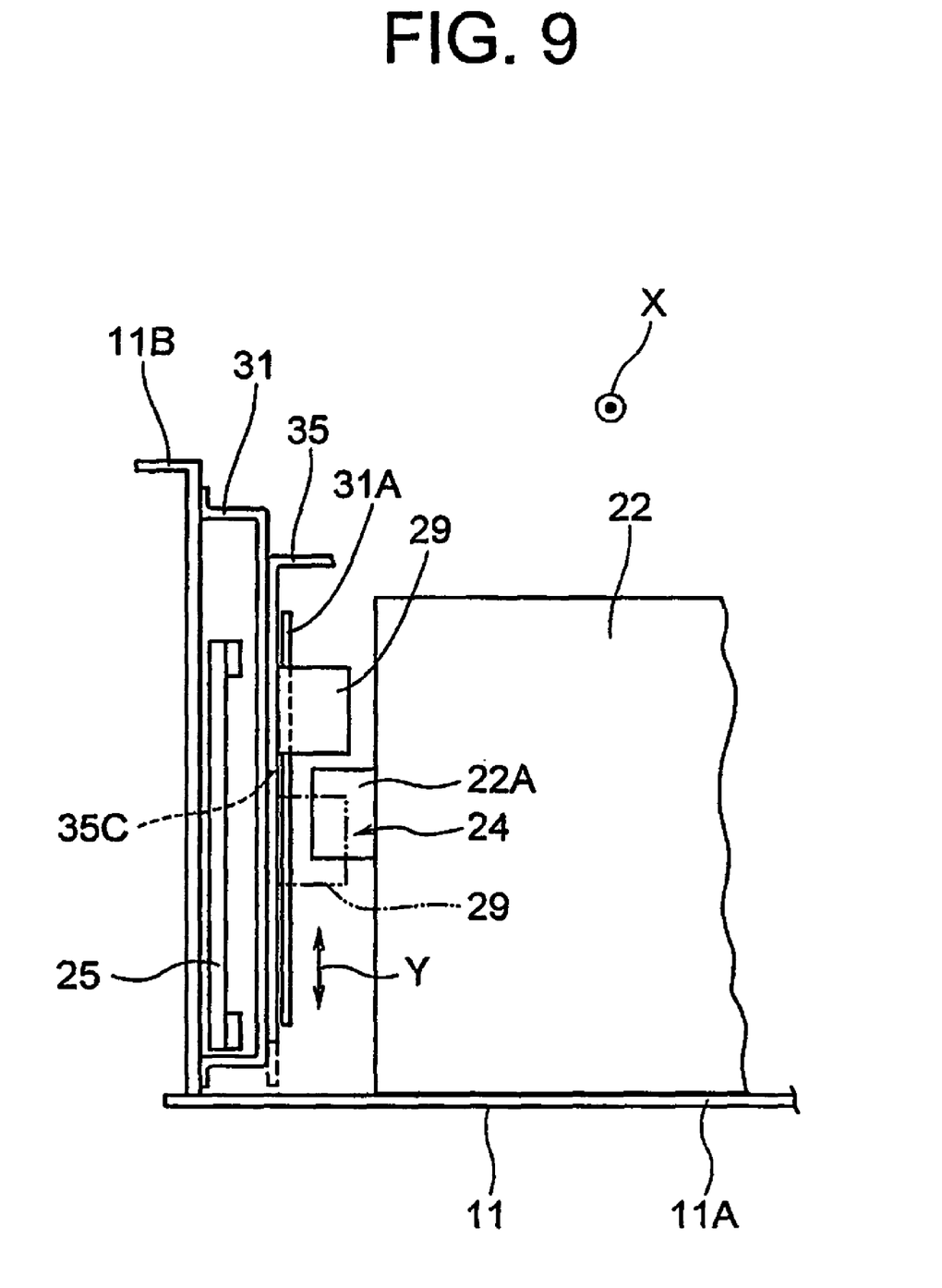
FIG. 9 is an elevational schematic view showing an engaged/disengaged state of a magazine blocker and the rear magazine.

As a result, the stopper part 35B of the magazine blocker 35 is also moved downward, so that it is engaged with the engaging part 22A of the rear magazine 22. That is, the rear magazine 22 is not jetted out from the magazine blocker 35 and also from the device main body 11 as a result.

Note here that the jet-out preventing mechanism 34 is configured with the stopper part 35B of the magazine blocker 35, the positioning pin 28, and the cam groove 35C, particularly the upper groove 35D, of the magazine blocker 35.

Further, the housing body extracting mechanism 38 is provided to the device main body 11 in order to extract the rear magazine 22 from the device main body 11 after the rear magazine 22 is pulled out by the magazine slider 25.

That is, the housing body extracting mechanism 38 is configured with the stopper part 35B of the magazine blocker 35, the positioning pin 28, and the cam groove 35C of the magazine blocker 35, which are the structural elements of the jet-out preventing mechanism 34. However, in this housing body extracting mechanism 38, it is an essential condition that the positioning pin 28 is engaged with the lower groove 35E that configures the cam groove 35C.

At this time, it is in a state where the positioning pin 28 is moved from the upper groove 35D position to the lower groove 35E position and, as shown with an arrow Y2 in FIG. 6, the magazine blocker 35 is pushed up to the upper side by the positioning pin 28. Accordingly, the stopper part 35B of the magazine blocker 35 is also moved to the upper side and, as shown in FIG. 9, the engagement between the engaging part 22A of the rear magazine 22 and the stopper part 35B of the magazine blocker 35 is released. That is, the rear magazine 22 can be extracted from the device main body 11.

Note here that the housing body extracting mechanism 38 is configured with the stopper part 35B of the magazine blocker 35, the positioning pin 28, and the lower groove 35E that configures the cam groove 35C of the magazine blocker 35.

Further, as described above, the accessor mechanism 12 is disposed on the outer side of the front magazine 21 of the device main body 11. This accessor mechanism 12 is formed to be able to mount a prescribed magnetic tape cartridge 14 that is extracted from the front magazine 21 or the rear magazine 22 by a known method within the magazine housing space 17 of the device main body 11.

The accessor mechanism 12 is formed to be freely movable along the inserting/extracting direction X as well as the vertical direction shown with an arrow Y in order to receive the prescribed magnetic tape cartridge 14 fed from the inside the front magazine 21.

Therefore, when receiving an arbitrary magnetic tape cartridge 14 within the front magazine 21, the accessor mechanism 12 is moved vertically at first since the magnetic tape cartridges 14 are housed in three stages within the front magazine 21. Then, the receiving part of the accessor mechanism 12 is set to a prescribed height position of the magnetic tape cartridge 14. Further, the accessor mechanism 12 is moved to a prescribed position along the moving direction (inserting/extracting direction) X to receive the arbitrary magnetic tape cartridge 14 from the front magazine 21.

Thereafter, the accessor mechanism 12 is moved towards the magnetic tape drive 13 to give the magnetic tape cartridge 14 received from the front magazine 21 to the magnetic tape drive 13.

Transfer of the magnetic tape cartridges 14 within the rear magazine 22 by the accessor mechanism 12 is also done in the same manner as the case with the front magazine 21.

That is, with respect to the rear magazine 22 located on the inner side of the front magazine 21 in the inserting/extracting direction within the magazine housing space 17, the accessor mechanism 12 is moved to a prescribed position, and a prescribed magnetic tape cartridge 14 is received from the inside the rear magazine 22.

Thereafter, the accessor mechanism 12 is moved towards the magnetic tape drive 13 to give the magnetic tape cartridge 14 received from the rear magazine 22 to the magnetic tape drive 13.

As described above, on the opposite side of the accessor mechanism 12 by sandwiching the device main body 11 and also on the outside of the device main body 11, the magnetic tape drive 13 is placed in the drive set space 18 which is adjacent to the magazine housing space 17 sectioned by the partition member 15.

This magnetic tape drive 13 receives from the accessor mechanism 12 the magnetic tape cartridge 14 transported by the accessor mechanism 12, and read/write data of the magnetic tape cartridge 14.

Next, operations of the device 10 configured in the above-described manner will be described.

For having a prescribed magnetic tape cartridge 14 within the front magazine 21 and the rear magazine 22 placed in parallel in the device main body 11 loaded by the magnetic tape drive 13, one of the magnetic tape cartridges 14 taken out from the front magazine 21 or the rear magazine 22 is grasped by the accessor mechanism 12 that transports the cartridge 14 within the accessor moving space 19, the accessor mechanism 12 is moved to the magnetic tape drive 13 position, and the transported magnetic tape cartridge 14 is loaded to the magnetic tape drive 13 at the movable end position.

When prescribed loading or the like of a large number of magnetic tape cartridges 14 within the front magazine 21 and the rear magazine 22 ends and it becomes necessary to exchange the cartridge with a new magnetic tape cartridge 14, first, a user extracts the front magazine 21 located on the front side of the inserting/extracting direction X to exchange the cartridge outside the device 10. Then, the user proceeds to the extraction work of the rear magazine 22 that is located on the back side of the inserting/extracting direction X.

After the rear magazine 22 is pulled out to the position of the jet-out preventing mechanism 34 by the housing body extracting mechanism 24, it is extracted towards the outside of the device main body 11 by the effect of the housing body extracting mechanism 38.

At this time, the user grasps the grip 27 to pull out the magazine slider 25 along the inserting/extracting direction X to the front side of the device main body 11 as shown with an arrow X1 in FIG. 5 to have the engaging projection part 29 of the magazine slider 25 engaged with the engaging part 22A of the rear magazine 22, and then puss out the magazine slider 25 continuously to the position of the magazine blocker 35. At this time, the magazine slider 25 moves by being guided by the guide rail 30.

When the magazine slider 25 is extracted to the maximum, the positioning pin 28 provided to the magazine blocker 35 comes off from the cam groove 35C, the magazine blocker 35 moves downward by its own weight, the stopper part 35B thereof also moves to a lower position, and the stopper part 35B is engaged with the engaging part 22A of the rear magazine 22. With this, even if the rear magazine 22 is pulled out with a strong force, it can be stopped with the stopper part 35B. Therefore, it is possible to prevent the rear magazine 22 from being jetted out from the device main body 11.

Then, for extracting the rear magazine 22 from the device main body 11, the magazine slider 25 is pushed into the back side of the inserting/extracting direction X and the positioning pin 28 is moved from the position of the upper groove 35D to the position of the lower groove 35E. Upon this, the magazine blocker 35 is pushed up by the positioning pin 28. Accordingly, the stopper part 35B of the magazine blocker 35 is moved towards the upper side, so that the engagement between the engaging part 22A of the rear magazine 22 and the stopper part 35B of the magazine blocker 35 is released.

Thereafter, the user may extract the rear magazine 22 from the device main body 11.

After completing the exchange of the magnetic tape cartridges 14 housed inside the front magazine 21 and the rear magazine 22 on the outer side of the device 10, the rear magazine 22 and the front magazine 21 are housed backed to the inside the magazine housing space 17 of the device main body 11 through the reverse action of the above-described action.

First, for housing the rear magazine 22, the magazine slider 25 is pushed to the back side of the inserting/extracting direction X, and it is checked to confirm that the positioning pin 28 is engaged at the position of the lower groove 35E of the cam groove 35C. Then, in a state where the engaging part 22A of the rear magazine 22 is facing towards the magazine blocker 35 side, the magazine 22 is pushed into the magazine housing space 17.

After pushing the magazine 22 by the hand as much as possible, the user then pushes the front magazine 21 checking the facing direction so as to push in the rear magazine 22 by the front magazine 21 until it comes to abut against the first partition member 15 that is provided on the inner side of the magazine housing space 17.

When the front magazine 21 and the rear magazine 22 are placed in parallel, works such as transfer (receiving and giving) and the like of the magnetic tape cartridge 14 by each of the magazines 21, 22, the accessor mechanism 12, and the magnetic tape drive 13 are executed in the manner described above.

With the embodiment described above, effects as follows can be achieved.

(1) The magazine pullout mechanism 24 makes it possible to pull out the rear magazine 22 on the back side of the inserting/extracting direction X towards the front side easily. Further, the magazine extracting mechanism 38 makes it possible to extract the pulled out rear magazine 22 from the device main body 11. Therefore, together with the front magazine 21 extracted by hands, exchanges of the magnetic tape cartridges 14 placed inside the both magazines 21 and 22 can be done on the outside of the device 10. Thereby, the magnetic tape cartridges 14 can be exchanged easily.

(2) The front magazine 21 and the rear magazine 22 are arranged in parallel within a same plane, e.g., within a horizontal plane, and a large number of magnetic tape cartridges 14 can be housed inside the front magazine 21 and the rear magazine 22 by being stacked upwardly. Therefore, packaging density of the magnetic tape cartridges 14 can be increased.

(3) The magazine pullout mechanism 24 which makes it possible to pull out the rear magazine 22 along the inserting/extracting direction X is provided to the first chassis part 11B along the magazine housing space 17, and it alone sufficiently functions to pull out the magazine. Therefore, it is not necessary to provide the magazine extracting mechanism to the opposing second chassis part 11C. As a result, there is only one magazine pullout mechanism 24 needed, so that the device 10 can be simplified.

(4) The magazine pullout mechanism 24 for pulling out the rear magazine 22 towards the front side along the inserting/extracting direction X is configured with the guide rail 30 and the magazine slider 25 guided by the guide rail 30, and the engaging projection part 29 for being engaged with the engaging part 22A of the rear magazine 22 is provided at the rear end part of the magazine slider 25. Therefore, the structure thereof is simple.

(5) Since the grip 27 is provided at the front end part in the inserting/extracting direction X of the magazine slider 25 that configures the magazine pullout mechanism 24, the magazine slider 25 can be pulled out by grasping the grip 27. This makes it easier to pull out the magazine slider 25, and to pull out the rear magazine 22 as a result.

(6) The jet-out preventing mechanism 34 is formed with the magazine blocker 35 that is provided on one of the side faces of the housing space 17 and in the vicinity of the front side of the inserting/extracting direction X, and one-side end of the magazine blocker 35 is the stopper 35B. A part of the pulled out rear magazine 22 abuts against the stopper 35B, and the movement of the rear magazine 22 is stopped thereby. As a result, it is possible to prevent the rear magazine 22 from being jetted out from the device main body 11 when it is pulled out, thereby making it possible to secure the safety.

(7) Through vertical movements of the stopper part 35B of the magazine blocker 35, the positioning pin 28 and the cam groove 35C are engaged or disengaged. With this, the magazine blocker 35 can provide a jet-out preventing function for the rear magazine 22 from the device main body 11 and an extracting function of the rear magazine 22 from the device main body 11. Thus, the magazine blocker 35 can function as both the jet-out preventing mechanism 34 and the magazine extracting mechanism 38, which means that a single member can provide a plurality of functions. Therefore, the number of members used therewith can be suppressed.

(8) The housing space 17 for housing the magazine 20 is provided to the device main body 11, so that the front magazine 21 and the rear magazine 22 are housed in the housing space 17. Thus, compared to a case where the front magazine 21 and the like are provided on the top face of the device main body 11, for example, the height of the device main body 11 can be lowered. Thereby, the size of the device 10 can be reduced. This makes it possible to reduce the size of the device 10.

The first standing partition member 15 is provided at the back side position of the inserting/extracting direction X of the housing space 17. Thus, when placing the rear magazine 22 configuring the magazine 20 at the back side position of the inserting/extracting direction X, the rear magazine 22 may simply be pushed in until it comes to abut against the first partition member 15. This makes it possible to determine the position of the rear magazine 22 easily.

As exemplary advantages according to the invention, with the magnetic tape library device according to the present invention, the cartridge housing body on the back side of the inserting/extracting direction can be easily pulled out towards the front side by the housing body pullout mechanism. Further, the pulled-out cartridge housing body can be easily extracted from the device main body by the housing body extracting mechanism, and exchanges of the magnetic tape cartridges within a plurality of cartridge housing bodies can be done outside the device. Thus, the magnetic tape cartridges can be easily exchanged.

Furthermore, it is possible to arrange a plurality of cartridge housings in parallel on a same plane such as within a horizontal plane, and to house a large number of magnetic tape cartridges in a vertically stacked manner within those cartridge housing bodies. Therefore, the packaging density of the magnetic tape cartridges can be increased.

Note here that the present invention is not limited to the exemplary embodiment described above, and the present invention is to include changes, modifications, and the like within the scope with which the exemplary object of the invention can be achieved.

For example, with the exemplary embodiment, the magazine 20 is configured with the two magazines, i.e., the front magazine 21 and the rear magazine 22, and the front magazine 21 and the rear magazine 22 are provided in parallel within the magazine housing space 17. However, the present invention is not limited only to such case. For example, the magazine may be formed as a structure which is configured with three magazines, i.e., a front magazine, a middle magazine, and a rear magazine.

In that case, a magazine slider formed longer than the magazine slider 25 may be used to pull out the rear magazine. When using the middle magazine, the middle magazine may be moved by pulling out the rear magazine.

Further, with the exemplary embodiment, the front magazine 21 configuring the magazine 20 is formed in a size in which a total of eighteen cartridges (three stages in three rows in the inserting/extracting direction and two rows in the direction orthogonal to the inserting/extracting direction) can be housed, for example, and the rear magazine 22 is formed in a size in which a total of twelve cartridges (three stages in two rows in the inserting/extracting direction and two rows in the direction orthogonal to the inserting/extracting direction) can be housed. However, the present invention is not limited only to such case.

With the same layout, there may be four stages or more to be piled up as long as the height thereof stays within a limit. This makes it possible to increase the packaging density of the cartridges 14 still more.

Furthermore, with the exemplary embodiment, the magazine 20 is configured with the front magazine 21 and the rear magazine 22 in different sizes form each other, i.e., the number of magnetic tape cartridges 14 housed inside thereof are different. However, the present invention is not limited only to such case. The front magazine and the rear magazine formed in a same size may also be arranged in a parallel state.

Moreover, with the exemplary embodiment, one each of the front magazine 21 and the rear magazine 22 configuring the magazine 20 are arranged in parallel within the magazine housing pace 17 of the device main body 11, and the magnetic tape cartridges 14 are housed in three stages along the vertical direction on the inside of each of the magazines 21 and 22. However, the present invention is not limited only to such case.

For example, the front magazine 21 and the rear magazine 22 may be stacked in two or three stages upwardly as the layout of the exemplary embodiment. This makes it possible to increase the packaging effect still further.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The device of the present invention can be utilized for easily pulling out, among a plurality of cartridge housing bodies placed in parallel within a horizontal plane with a large number of magnetic tape cartridges housed inside thereof, the cartridge housing body at the back side of the inserting/extracting direction to a prescribed position and extracting it.

What is claimed is:

1. A magnetic tape library device, comprising:
a plurality of cartridge housing bodies for housing a large number of magnetic tape cartridges inside thereof;
a device main body for housing the cartridge housing bodies within a same plane in a freely slidable manner and in parallel to an inserting/extracting direction;
an accessor mechanism provided to one of side faces of the device main body along the inserting/extracting direction for transporting the magnetic tape cartridge that is extracted from one of the plurality of cartridge housing bodies; and
a magnetic tape drive provided to the device main body for loading the magnetic tape cartridge transported by the accessor mechanism to read and write data, wherein
the device main body includes:
a housing body pullout mechanism for pulling out the cartridge housing body on a back side of the inserting/extracting direction among the plurality of the cartridge housing bodies towards a front side of the inserting/extracting direction; and a housing body extracting mechanism for extracting, from the device main body, the cartridge housing body pulled out by the housing body pullout mechanism.

2. The magnetic tape library device as claimed in claim 1, wherein:
the housing pullout mechanism is formed with a slider guide member provided in the side face of the other side of the device main body along the inserting/extracting direction, and a slide member that can be freely slidable in the inserting/extracting direction by being guided by the slider guide member; and
an engaging projection part for pulling out the cartridge housing body towards the front side is provided at a back-side end of the slider member in the inserting/extracting direction for enabling the engaging projection part to be engaged with an engaging part formed in the cartridge housing body.

3. The magnetic tape library device as claimed in claim 1, wherein
a grasping member that is grasped by a user when pulling out the slide member is provided at a front end part of the slide member in the inserting/extracting direction.

4. The magnetic tape library device as claimed in claim 1, wherein
a jet-out preventing mechanism for preventing the cartridge housing body from being jetted out from the device main body when the cartridge housing body is pulled out by the slide member is provided to the side face of the other side of the device main body, which is the front end side of the inserting/extracting direction.

5. The magnetic tape library device as claimed in claim 4, wherein
the jet-out preventing mechanism is formed with: a locking member having a stopper part to be engaged with the engaging part of the cartridge housing body, the locking member being provided to the device main body via an attachment member; and
a locking member fixing mechanism which functions when the cartridge housing body is pulled towards the front side of the inserting/extracting direction by the slide member so as to fix the locking member at a position to be engaged with the engaging member of the cartridge housing body.

6. The magnetic tape library device as claimed in claim 5, wherein
the locking member is supported by the attachment member to be freely movable in a vertical direction that is orthogonal to the inserting/extracting direction.

7. The magnetic tape library device as claimed in claim 5, wherein
the locking member fixing mechanism is formed with: a positioning pin that is provided at an end part of the slide member on a side of the grasping member by being projected towards the cartridge housing body side; and
a cam groove formed in the locking member, which functions when the slide member is pulled out to move the locking member to an upper side to be engaged with the engaging part by being guided by the positioning pin.

8. The magnetic tape library device as claimed in claim 7, wherein:
the cam groove is formed with an upper groove and a lower groove having a step therebetween in a vertical direction formed along the inserting/extracting direction, and with an oblique groove part connecting between the upper groove and the lower groove; and
a distance between the upper groove and the lower groove is a moving distance of the locking member in the vertical direction, the stopper part moves downwards when the positioning pin is engaged with the lower groove, and engagement with the engaging part of the cartridge housing body can be released, whereby the housing body extracting mechanism is achieved.

9. The magnetic tape library device as claimed in claim 1, wherein
a housing body housing space for housing the plurality of cartridge housing bodies in a parallel state is provided to the device main body.

10. The magnetic tape library device as claimed in claim 9, wherein
a drive housing space for housing the magnetic tape drive is provided at a back-side position of the inserting/extracting direction of the housing body housing space.

11. A magnetic tape library device, comprising:
a plurality of cartridge housing bodies for housing a large number of magnetic tape cartridges inside thereof;
a device main body for housing the cartridge housing bodies within a same plane in a freely slidable manner and in parallel to an inserting/extracting direction;
accessor means provided to one of side faces of the device main body along the inserting/extracting direction for transporting the magnetic tape cartridge that is extracted from one of the plurality of cartridge housing bodies; and
magnetic tape drive means provided to the device main body for loading the magnetic tape cartridge transported by the accessor means to read and write data, wherein
the device main body includes:
housing body pullout means for pulling out the cartridge housing body on a back side of the inserting/extracting direction among the plurality of the cartridge housing bodies towards a front side of the inserting/extracting direction; and housing body extracting means for extracting, from the device main body, the cartridge housing body pulled out by the housing body pullout means.

* * * * *